(12) United States Patent  
Shrestha et al.

(10) Patent No.: US 7,352,525 B1  
(45) Date of Patent: Apr. 1, 2008

(54) HARD DISK DRIVE FLY HEIGHT ADJUST METHOD AND APPARATUS DURING ERROR RECOVERY

(75) Inventors: Rajita Shrestha, Westminster, CO (US); Christine Green, Longmont, CO (US); Jerry Moline, Denver, CO (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 11/449,579

(22) Filed: Jun. 7, 2006

Related U.S. Application Data

(60) Provisional application No. 60/688,112, filed on Jun. 7, 2005.

(51) Int. Cl.  
*G11B 21/02* (2006.01)

(52) U.S. Cl. ...................................... 360/75
(58) Field of Classification Search ............... 360/75, 360/31, 53, 25  
See application file for complete search history.

(56) References Cited

U.S. PATENT DOCUMENTS

| | | | |
|---|---|---|---|
| 5,377,058 A * | 12/1994 | Good et al. ............... 360/75 |
| 6,084,733 A * | 7/2000 | Ohzeki et al. ............... 360/53 |
| 6,249,393 B1 * | 6/2001 | Billings et al. ............... 360/31 |
| 6,335,850 B1 * | 1/2002 | Dunfield et al. ............ 360/294.5 |
| 6,366,416 B1 * | 4/2002 | Meyer et al. ............... 360/25 |
| 6,401,214 B1 * | 6/2002 | Li .......................... 714/6 |
| 6,411,458 B1 * | 6/2002 | Billings et al. ............... 360/75 |
| 6,538,836 B1 * | 3/2003 | Dunfield et al. ............ 360/75 |
| 6,577,466 B2 * | 6/2003 | Meyer et al. ............... 360/75 |
| 6,700,718 B2 * | 3/2004 | Wilson ..................... 360/31 |
| 6,700,729 B1 * | 3/2004 | Beck et al. ................ 360/76 |
| 6,760,174 B2 * | 7/2004 | Forehand ................... 360/53 |
| 7,199,960 B1 * | 4/2007 | Schreck et al. ............. 360/75 |
| 2003/0007279 A1 * | 1/2003 | Johnson et al. ............. 360/75 |
| 2003/0172520 A1 * | 9/2003 | Liu et al. ................ 29/603.03 |
| 2005/0216800 A1 * | 9/2005 | Bicknell et al. ............ 714/718 |
| 2006/0072230 A1 * | 4/2006 | Eaton et al. ............... 360/39 |

* cited by examiner

*Primary Examiner*—Fred F. Tzeng  
(74) *Attorney, Agent, or Firm*—Myers Bigel Sibley & Sajovec

(57) ABSTRACT

Data recovery, following a read error in a hard disk drive, is provided which includes an adjustment of fly height. In one embodiment, some re-reads are performed by both adjusting the fly height and the off-track positioning of the read head. In one embodiment, two or more fly heights are normally used during read/write operations such as in a zoned manner, and adjustments to fly heights are performed with respect to the fly height for the zone where the error occurred.

8 Claims, 5 Drawing Sheets

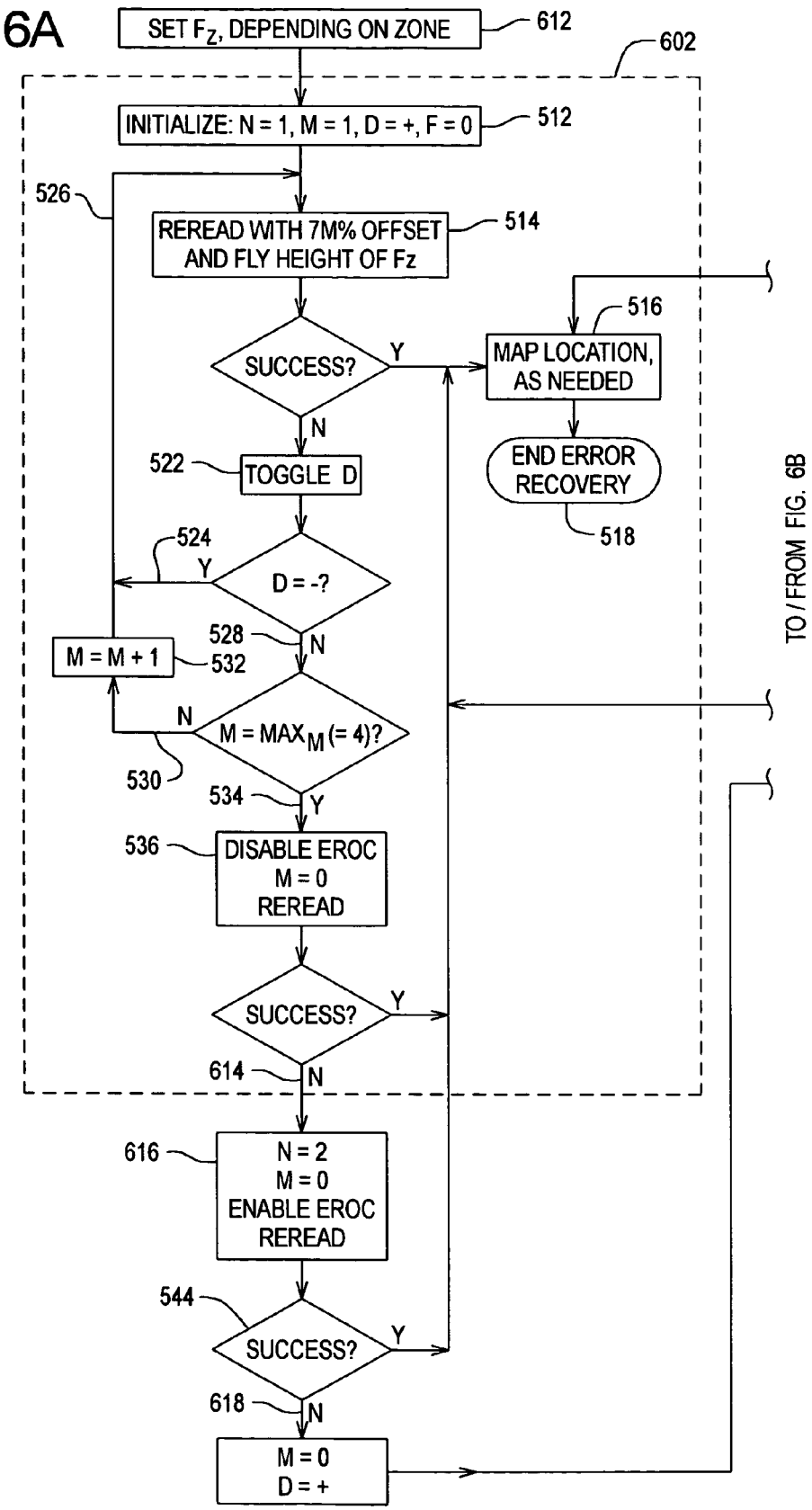

HARD DISK DRIVE FLY HEIGHT ADJUST METHOD AND APPARATUS DURING ERROR RECOVERY

CROSS-REFERENCE TO RELATED APPLICATIONS

Priority is claimed in U.S. Provisional Patent Application Ser. No. 60/688,112 filed Jun. 7, 2005 entitled "Fly Height Adjust During Error Recovery," which is incorporated herein by reference.

FIELD OF THE INVENTION

The present application is directed to a method, apparatus and system for recovering data following a read error by adjusting fly height.

BACKGROUND INFORMATION

Previous hard disk drives (HDDs) typically include devices and/or procedures capable of detecting the occurrence of an error occurring during a read operation (or similar operations such as "verify"). Many previous HDDs also include apparatuses and procedures intended to recover some or all of the data. Recovery can include such items as performing a re-read in the same conditions and/or performing a re-read while altering conditions such as the number of revolutions (i.e., the number the times the re-read is consecutively tried at a given disk location), changing the tracking (such as moving the read head slightly off the nominal track center, i.e. "microjog") and the like. Other approaches have been used such as error correction procedures and the like.

Although previous error recovery procedures can succeed in recovering data following some read errors, it is believed there is room for improvement in this regard. Accordingly, it would be useful to provide a system method and apparatus which can efficiently and effectively recover at least some data following detection of a read error.

Some HDDs include the capability of changing or adjusting the fly height of the read head (the distance of the read head from the adjacent section of the disk). Although there have been proposals for changing fly height in connection with error recovery, it is believed there is room for improvement in this regard. Accordingly, it would be useful to provide a system, method and apparatus which uses fly height adjustment to achieve efficient and effective data recovery.

In at least some situations, it is substantially convenient or efficient to provide for error recovery procedures which consume a limited and/or known amount of time or computation or other resources. Accordingly, it would be useful to provide an error recovery system, method and apparatus which is not only effective and efficient, but also is short and/or determinant with respect to the amount of time (or maximum amount of time) or other resources required.

SUMMARY OF THE INVENTION

The present invention includes a recognition and/or appreciation of the existence, source and/or nature of problems in previous approaches, including those described herein.

According to one embodiment of the invention, following a read error, an error recovery procedure includes a potential for adjusting the fly height of the read head and performing a re-read. In one embodiment, some or all re-reads at the adjusted fly height can include microjog or other off-track reading. In one embodiment, adjustments in fly height are made with respect to two or more different nominal fly heights which are normally used over two or more different regions of the disk, respectively. In one embodiment of the invention, the error recovery procedure involves a known or predetermined maximum number of steps or revolutions. In one embodiment, the error recovery procedure includes a known predetermined number of different fly heights.

In one embodiment, data recovery, following a read error in a hard disk drive, is provided which includes an adjustment of fly height. In one embodiment, some re-reads are performed with both adjustment of the fly height and off-track positioning of the read head. In one embodiment, two or more fly heights are normally used during read/write operations such as in a zoned manner, and adjustments to fly heights are performed with respect to the fly height for the zone where the error occurred.

DETAILED DESCRIPTION

Figure 1:
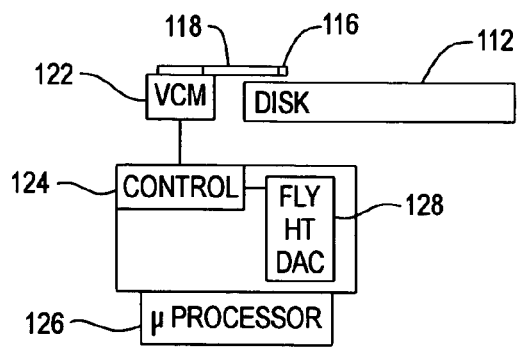
FIG. 1 is a block diagram of selected components of a hard disk drive of a type usable in connection with embodiments of the present invention.

As depicted in FIG. 1, in a typical disk drive, a disk 112 (in some HDDs, two or more disks) has at least one surface (and in some HDDs, both surfaces) configured for reading and/or writing data. A read/write head 116 is positioned by an actuator arm 118, typically controlled by a voice coil motor 122 under control of a motor controller 124. Control circuitry, typically including a microprocessor 126, provides control instructions for moving the actuator arm 118 to position the head 116 as will be understood by those skilled in the art. In some HDDs, the microprocessor 126 or other control circuitry can change the fly height of the head 116 (i.e., the distance between the read/write head and the surface of the disk 112). In the embodiment depicted in FIG. 1, a digital-to-analog converter (DAC) 128 can convert digital fly height commands to an analog signal for a heater coil or other fly height adjustment device. Although the signal from the DAC 128 can, at least, theoretically have any of an infinite number of values, typically the input digital information defines only a finite number of levels or increments of fly height or fly height adjustment (defining a fly height minimum increment).

Figure 2:
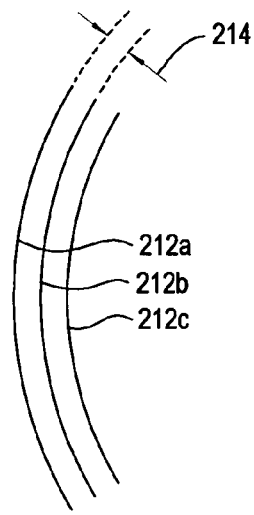
FIG. 2 is a top plan view of a portion of the disk of a HDD showing an inter-track distance.

As depicted in FIG. 2, the data on a typical HDD disk is written along a plurality of concentric tracks 212A, B, C having an inter-track distance 214, therebetween. Although the data is typically intended to be written along, or read from, positions which are defined with respect to the center of said tracks 212A, B, C, a number of conditions can result in some amount of misplacement of the data with respect to the track center position. One condition which is associated with potential misplacement of data is runout (inexact concentricity or circularity of tracks with respect to the rotation axis). In some HDDs, information about any such runout is stored and is used to provide an amount of embedded runout correction (EROC) during ordinary read/write operations.

Figure 3:
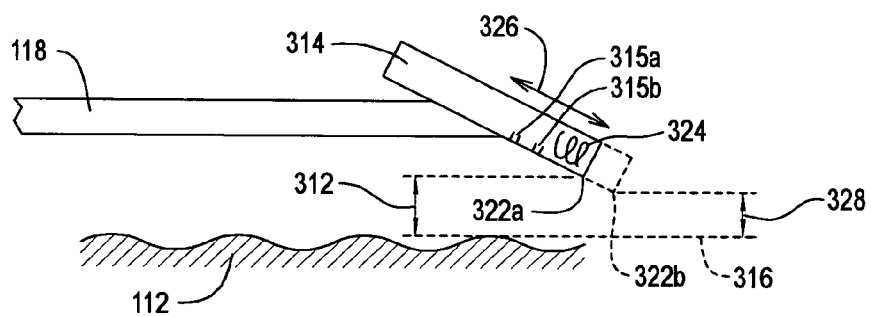
FIG. 3 is a schematic view, not to scale, showing relative position of a read head and disk surface.

As depicted in FIG. 3, a fly height 312 of the read/write head 314 can be defined as the distance from the local, averaged or nominal level of the upper surface 316 of the disk 112 to a defined point on the read/write head such as the trailing edge 322a and like. The read/write head 314, as depicted, includes a read gap 315a and write gap 315a. In the depicted embodiment, the read/write head 314 is provided with a resistive element such as a heating coil 324. When the heating coil 324 is provided with current, the resulting generated heat causes expansion 326, resulting in protrusion 322b of the tip of the read/write head, as well as protrusion of the portion of the head containing the read gap 315a. In this way, the current provided to the coil 324 can be used to decrease the fly height 328 and also move the read head closer to the surface 316 of the disk 112. By using a first value of current, for the coil 324, during normal (read/write) operations, the fly height can be adjusted, with respect to such a normal fly height, both downwardly (by increasing the current) and upwardly (by decreasing the current).

Figure 4:
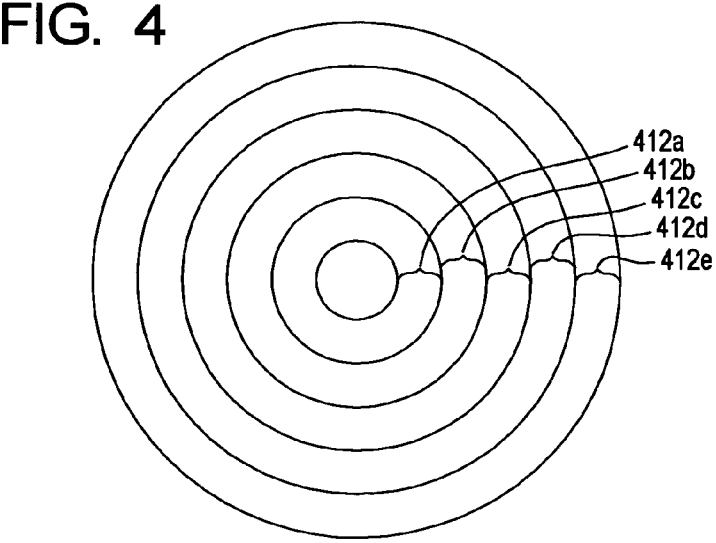
FIG. 4 is a diagrammatic top plan view of a disk illustrating data zones.

As depicted in FIG. 4, in many HDDs, the tracks are grouped into a plurality of radial zones 412A, 412B, 412C, 412D, 412E. Although FIG. 4 illustrates five zones, typically a larger number of zones are used. Generally, the zones are used as a way of storing more data in the radially-more-outward portions of the disk where the track lengths are longer. Generally, this involves tracks of a radially-more-outward zone having a larger number of data blocks per sector than tracks of a radially-inward zone.

At least some embodiments of the present invention involve HDDs in which the normal or nominal fly height which is used during read/write operations can be different for different radial portions or zones of the disk (e.g. to accommodate slight warpage e.g. from clamping or other effects, disk irregularities, and the like). It may be convenient to use, as the fly height zones, the same zones which are used for defining data sectors, although this is not necessary.

Table I illustrates stages, in one previous procedure, used in response to detection of a read error. A number of items can be indicative of a read error, including a signal level which is excessively low, bit patterns that do not correspond to expected bit patterns, parity or redundancy check errors (if used) and the like. Those skilled in the art understand various manners of detecting read errors.

TABLE I

| Level | Revs | Track Offset |
|---|---|---|
| 1 | 1 | +7% |
| 2 | 1 | −7% |
| 3 | 1 | +14% |
| 4 | 1 | −14% |
| 5 | 1 | +21% |
| 6 | 1 | −21% |
| 7 | 1 | +28% |
| 8 | 1 | −28% |
| 9 | 1 | 0% (disable EROC) |
| 10 | 4 | 0% |
| 11 | 4 | +7% |
| 12 | 4 | −7% |
| 13 | 4 | +14% |

TABLE I-continued

| Level | Revs | Track Offset |
|---|---|---|
| 14 | 4 | −14% |
| 15 | 4 | +21% |
| 16 | 4 | −21% |
| 17 | 4 | +28% |
| 18 | 4 | −28% |
| 19 | 4 | 0% (disable EROC) |

The general approach of the procedure illustrated in Table I is to attempt a re-read with increasing levels of outward and inward track offset (i.e., moving the read head slightly inwardly or outwardly from the track center, by a percentage of the inter-track distance 214). If needed, re-reads are also attempted with the EROC disabled and/or with a larger number of revolutions or repetitions of the read process where the read error occurred.

Figure 5:
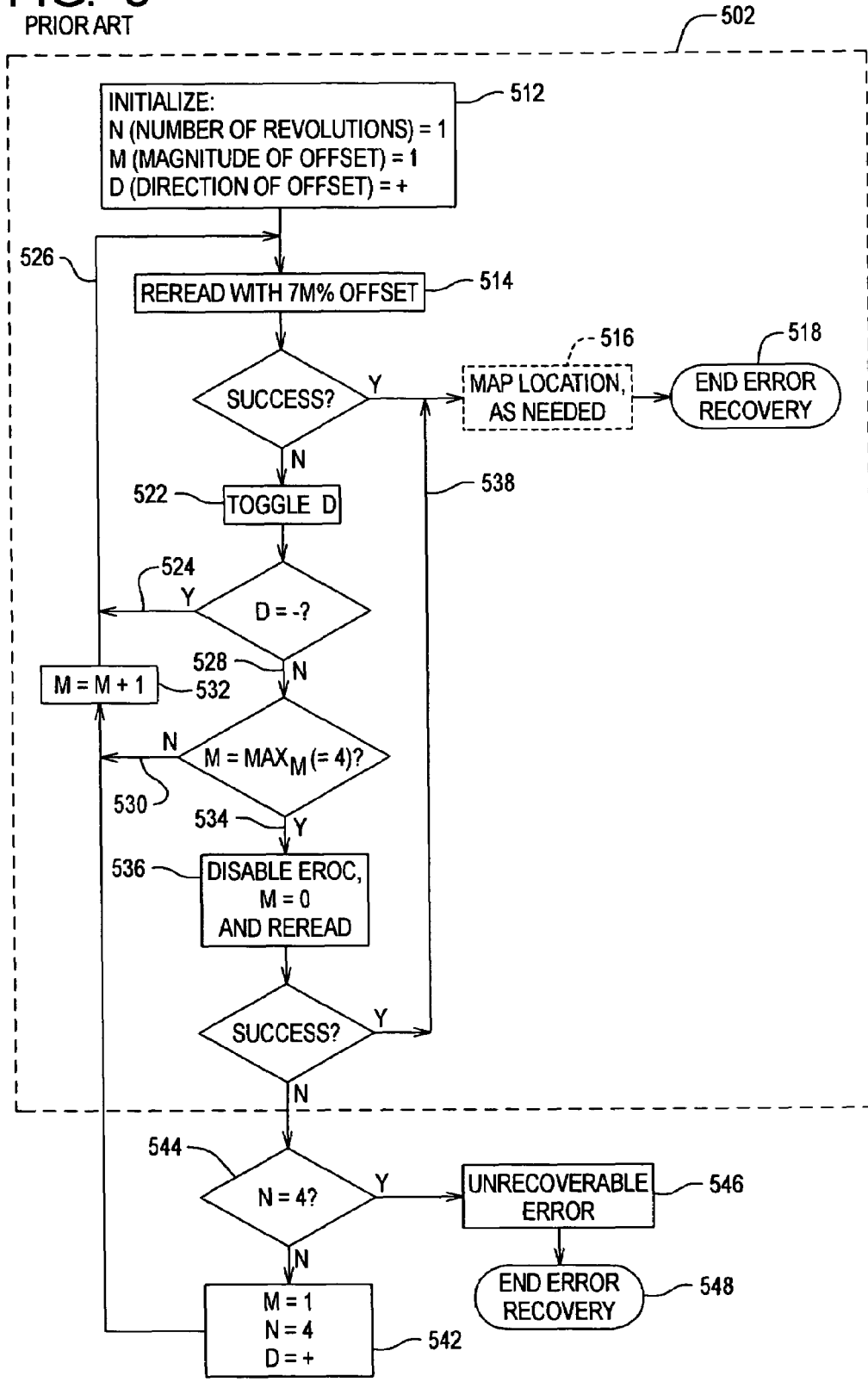
FIG. 5 is a flowchart illustrating a procedure according to previous approaches; and, FIGS. 6A-C form a flowchart that illustrates a procedure according to one embodiment of the present invention.

FIG. 5 illustrates a procedure which would result in substantially the sequence illustrated in Table I. FIG. 5 is believed useful to help understand the procedure, although in practice, it is generally more convenient to store the data of Table I and perform a series of re-reads, sequentially using the parameters specified in the various levels of Table I until a successful data recovery is achieved.

In the illustration of FIG. 5, the process initializes the number of revolutions (N) to one, the magnitude of the offset multiplier (N) to one and the direction of offset (D) to plus 512. The location of the read error is re-read with the position of the read head offset from the track center by a percentage of the inter-track distance 214 equal to a multiple of M (in the depicted embodiment, seven times M) 514. If the offset re-read is successful in recovering the data, a determination is made whether a re-mapping of this location of the disk is needed or advisable (so that future attempts to read or write at this location will be redirected to a different, presumably less error-prone, region of the disk) 516 and the error recovery procedure is ended 518. In some embodiments, there are situations in which the time or mode of error recovery indicates that there is no need to map the location. If the re-read is not successful, the direction (D) is toggled (e.g., from radially outward to radially inward, or plus to minus) 522. If the toggled value of D is minus 524 (indicating that, thus far, only the inward direction offset has been re-read at the present value of offset), the procedure loops 526 to attempt the re-read with the opposite direction. If the toggled value of D is plus 528 then, provided the magnitude of multiplier (M) has not reached its maximum value (in this embodiment four), 530, the value of M is incremented 532 and the procedure loops 526. Once the maximum amount of offset (with N=1) has been achieved 534, a re-read is performed without offset (M equals zero) and with EROC disabled 536. A successful re-read at this point will be treated 538 as described above. If no success is achieved, the entire early portion of the procedure 502 (which generally corresponds to levels 1-9 of Table I) is substantially repeated, except with the number of repetitions set to four 542. If the entire early procedure 502 does not achieve a successful re-read while N is equal to four 544, the error is considered unrecoverable by the depicted procedure 546 and the depicted error recovery procedure ends 548.

Table II illustrates error recovery according to one embodiment of the present invention. The error recovery of Table II includes attempted re-reads with the fly height being adjusted or changed.

TABLE II

| Level | Revs | Track Offset | Fly Height Change |
|---|---|---|---|
| 1 | 1 | +7% | none |
| 2 | 1 | −7% | none |
| 3 | 1 | +14% | none |
| 4 | 1 | −14% | none |
| 5 | 1 | +21% | none |
| 6 | 1 | −21% | none |
| 7 | 1 | +28% | none |
| 8 | 1 | −28% | none |
| 9 | 1 | 0% (disable EROC) | none |
| 10 | 2 | 0% | none |
| 11 | 1 | 0% | Fly 0.5 nm lower |
| 12 | 1 | 0% | Fly 1 nm lower |
| 13 | 2 | +7% | none |
| 14 | 1 | +7% | Fly 0.5 nm lower |
| 15 | 1 | +7% | Fly 1 nm lower |
| 16 | 2 | −7% | none |
| 17 | 1 | −7% | Fly 0.5 nm lower |
| 18 | 1 | −7% | Fly 1 nm lower |
| 19 | 2 | +14% | none |
| 20 | 1 | +14% | Fly 0.5 nm lower |
| 21 | 1 | +14% | Fly 1 nm lower |
| 22 | 2 | −14% | none |
| 23 | 1 | −14% | Fly 0.5 nm lower |
| 24 | 1 | −14% | Fly 1 nm lower |
| 25 | 2 | +21% | none |
| 26 | 1 | +21% | Fly 0.5 nm lower |
| 27 | 1 | +21% | Fly 1 nm lower |
| 28 | 2 | −21% | none |
| 29 | 1 | −21% | Fly 0.5 nm lower |
| 30 | 1 | −21% | Fly 1 nm lower |
| 31 | 2 | +28% | none |
| 32 | 1 | +28% | Fly 0.5 nm lower |
| 33 | 1 | +28% | Fly 1 nm lower |
| 34 | 2 | −28% | none |
| 35 | 1 | −28% | Fly 0.5 nm lower |
| 36 | 1 | −28% | Fly 1 nm lower |
| 37 | 2 | 0% (disable EROC) | none |
| 38 | 1 | 0% (disable EROC) | Fly 0.5 nm lower |
| 39 | 1 | 0% (disable EROC) | Fly 1 nm lower |

Figure 6B:
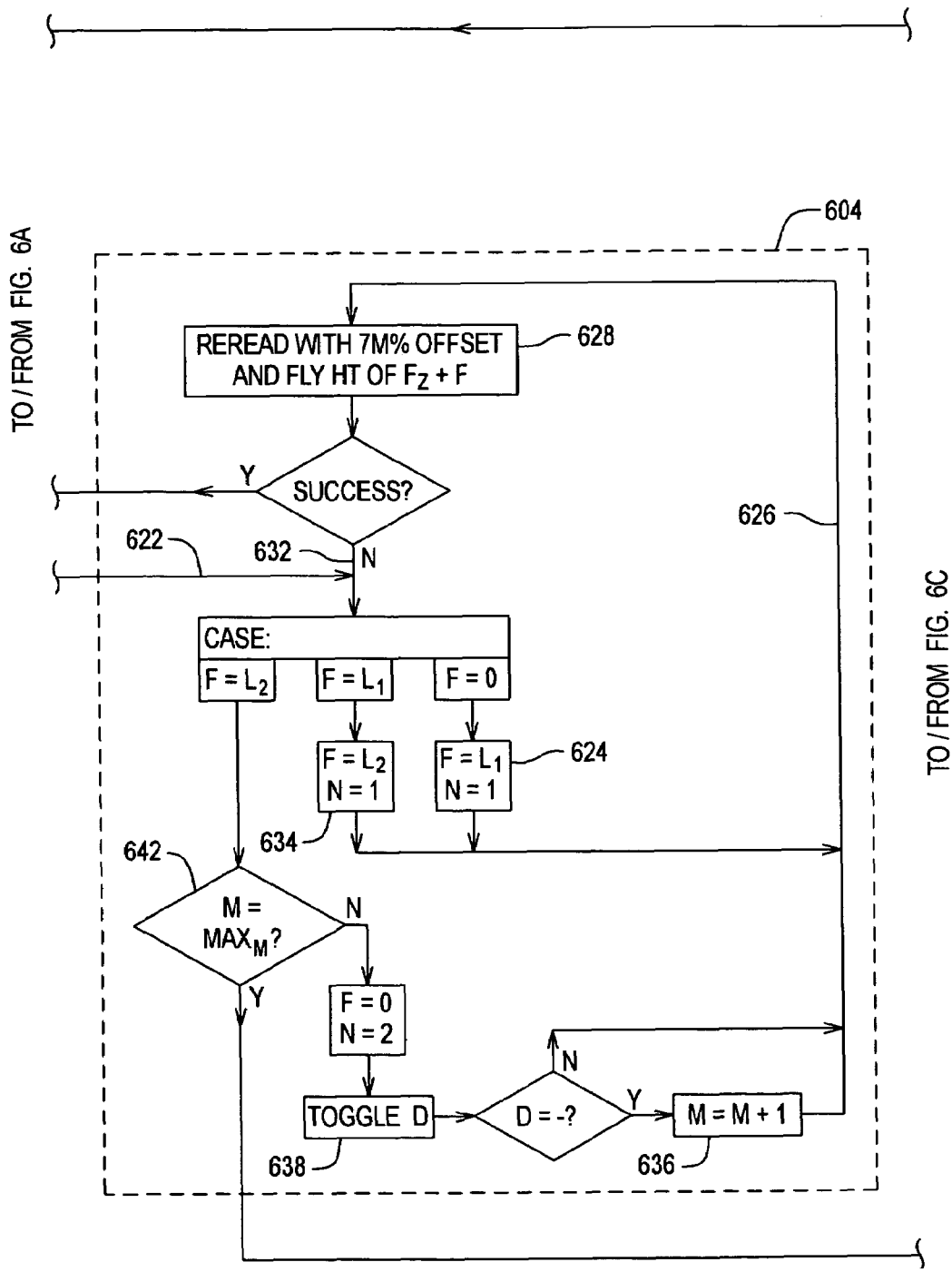
Figure 6C:
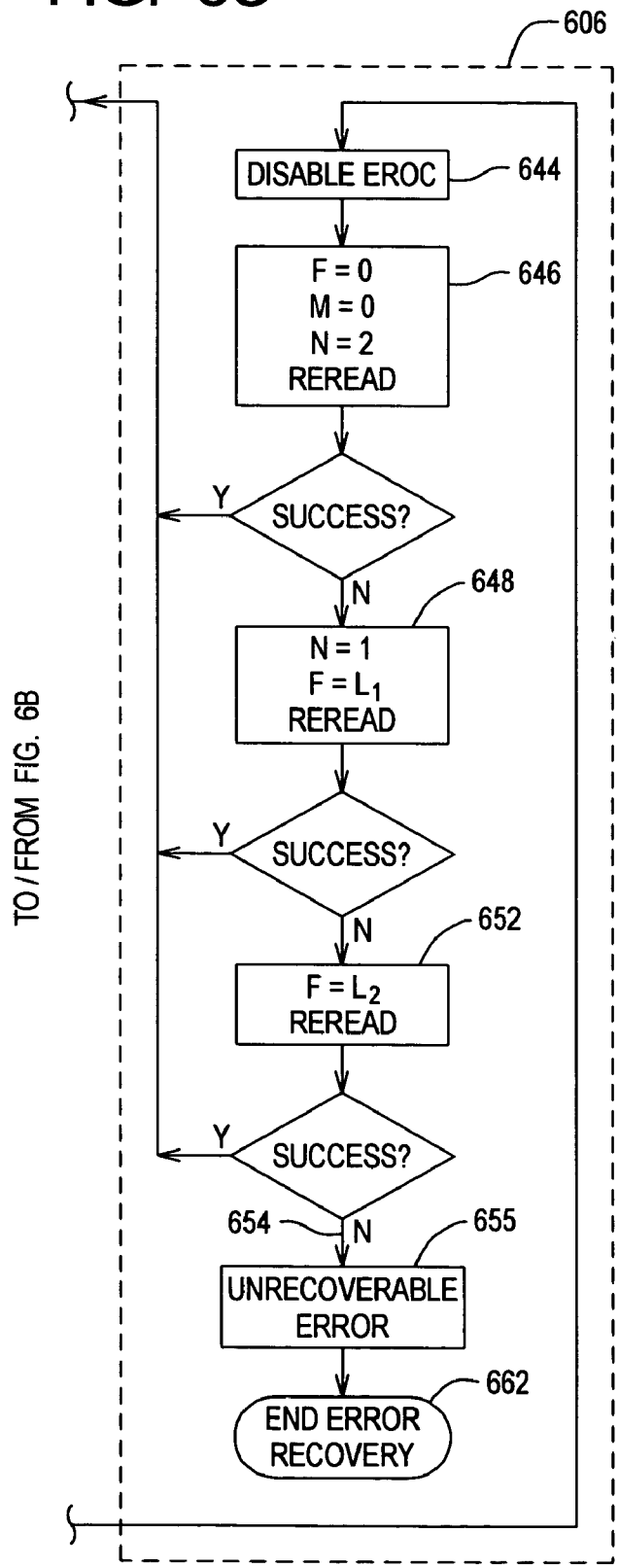

FIGS. 6A-6C illustrate a procedure of a type which can substantially produce the various levels noted in Table II. Although it is believed FIGS. 6A-6C are useful understanding the illustrated procedure and for understanding the differences, as compared to FIG. 5, it is not intended to indicate that the procedure of FIGS. 6A-6C is necessarily the only approach. Indeed, it is believed that it may be convenient, in many circumstances, to store the information shown in Table II and to perform a series of re-reads using the parameters of each level (as shown in Table II), in sequence, until a successful re-read is achieved.

In general, the procedure of FIGS. 6A-6C includes an initial portion 602 which generally corresponds to portion 502 of the procedure of FIG. 5, a fly height adjustment portion 604 in which attempts are made to re-read the data with various fly height levels, generally corresponding to levels 10-36 of Table II, and a portion 606, generally corresponding to level 37-39 of Table II in which re-reads are attempted, at various fly heights, with EROC disabled.

The procedure of FIGS. 6A-6C is configured to operate when the HDD has two or more normal or nominal (different) fly heights used for normal read/write operations in two or more different zones or other regions of the disk. In the embodiment shown in FIGS. 6A-6C, the zoned fly height value is set 612, for use during the error recovery procedure, depending on which zone the error occurred in. In the embodiment depicted in FIGS. 6A-6C, the initial portion 602 is substantially similar to the initial portion 502 of FIG. 5, with the re-reads being performed at the zoned fly height 514. If the initial portion (corresponding to levels 1-9 of Table II) does not result in a successful re-read 614, a re-read is performed with no offset but with two revolutions 616. If this procedure is not successful 618, the values of M and D are initialized and the system enters 622 a portion of the next section of the procedure 604. At this time, the fly height adjustment value will be zero and this value will be changed to a first level of downward adjustment $L_1$ 624. In at least one embodiment, the first level of downward adjustment will be substantially the smallest magnitude of downward adjustment which is available (e.g., which corresponds to one of the increments of the fly height DAC 128) that is believed large enough to be likely to have an effect on the results of a re-read. In the illustration of Table II, $L_1$ is equal to about 0.5 nanometers (nm). Commands are issued to provide a fly height adjustment, such as increasing the current to a heater on the read head (as described generally above). Preferably, the fly height adjustment is sufficiently responsive that the desired fly height adjustment can be achieved, following the previous re-read attempt, substantially by the time the rotation of the disk brings the sector, where the error occurred, back under (substantially) the read head (i.e., less than one disk revolution). In one embodiment, response time for fly height adjustment corresponds to about ⅛ of a disk revolution.

The number of revolutions or repetitions is set equal to one 624 and the procedure loops 626 to perform a re-read at the new fly height, which has been adjusted downward (with respect to the nominal fly height for the zone where the error occurred) ($F_2$) 628. If this re-read is not successful 632 fly height adjustment magnitude is increased to $L_2$ 634. In one embodiment, $L_2$ is substantially the largest available fly height adjustment which is not likely to result in head-disk interference. In the embodiment illustrated in Table II, $L_2$ is equal to about 1 nm.

If the re-read at such lower level is unsuccessful, 632, the procedure is repeated using the fly height adjustments of zero, $L_1$ and $L_2$, for increasing magnitudes of offset 636 in each direction 638. If none of these are successful, even after the maximum offset and maximum fly height adjustment have been used 642, the EROC is disabled 644 and re-reads are attempted with fly height adjustments of zero 646, $L_1$ 648 and $L_2$ 652. If success has not been achieved at this point 654, the unrecoverable error flag is set 655 and the error recovery procedure is ended 662. Various procedures or steps can be taken when it is determined the error recovery procedure has resulted in a so-called unrecoverable error, including flagging or decommissioning the sector or sectors where the error occurred so that the sectors will not be used in the future, providing additional error procedures, informing the user and the like, as will be understood by those skilled in the art.

In light of the above description, a number of advantages of the present invention can be seen. Embodiments of the present invention can provide for error recovery which is not obtainable using previous approaches. Accordingly, the present invention can reduce the overall frequency or occurrence of unrecoverable read errors. The present invention can provide for effective and efficient error recovery in conditions where two or more normal fly heights (e.g., for different zones) are provided on the HDD. The present invention can be implemented in a manner which has a predetermined maximum number of steps (or a total number of steps which occur when there is an unrecoverable read error), even when the normal fly height is variable or unknown. The present invention can provide a procedure which is determinate in the duration or number of steps or revolutions.

A number of variations and modifications of the invention can be used. Although embodiments of the invention have been described in connection with certain methods or procedures, it is possible to use other methods or procedures including procedures having fewer or more steps, or procedures in which the steps are performed in an order different from those illustrated or described.

Although embodiments have been described in which adjustments are made with respect to certain fly height or heights, (e.g. zoned fly heights) it is possible to provide nominal fly heights which are more or less numerous than those depicted or described, or are defined for regions which may differ from the typical servo sector zones, including being defined with respect to each (or small groups of) of the tracks and/or servo sectors of the disk, or in which adjustment is made with respect to a single nominal or average fly height value for the entire disk.

Although embodiments have been described in which error recovery includes height adjustment combined with microjog or other tracking adjustment, is possible to provide operable HDDs which use fly height adjustment alone or which combine fly height adjustment with other techniques.

Although embodiments have been described in which two levels of fly height adjustment are used, it is possible to provide embodiments in which only one level is used or in which more than two levels are used.

Although embodiments of the present invention have been described in which fly height adjustment is attempted only after track offset re-reads have been attempted, it is possible to provide embodiments in which fly height adjustment is used for a re-read attempt before any re-read with (only) off-track adjustment or in which no off-track (only) re-read attempts are made.

Although embodiments have been described in which the illustrated procedures are performed in response to a read error, it is also possible to provide embodiments in which the illustrated or described procedures are selectively performed. For example, if the nature or circumstances of the read error detection are indicative of certain types of error, other procedures may desirably be performed before or in place of those depicted and described herein. For example, if the circumstances indicate a read error associated with an asperity, a re-read procedure can be initiated which includes re-reading, including on-track re-reading, with the fly height increased rather than decreased.

Although Table II outlines one embodiment of using fly height (FH) adjustment during error recovery, other arrangements are possible. Table III illustrates another embodiment of the invention. In Table III, the "backoff" amount is in the range of 3 to 3.5 nm.

TABLE III

| Level | Revs | Track Offset | Feature Changes |
|---|---|---|---|
| 1 | 1 | +7% | None |
| 2 | 1 | −7% | None |
| 3 | 1 | +14% | None |
| 4 | 1 | −14% | None |
| 5 | 1 | +21% | None |
| 6 | 1 | −21% | None |
| 7 | 1 | +28% | None |
| 8 | 1 | −28% | None |
| 9 | 1 | 0% (disable EROC) | None |
| 10 | 2 | 0% | None |
| 11 | 2 | 0% | Lower FH by 15% of backoff |
| 12 | 2 | +7% | None |
| 13 | 2 | +7% | Lower FH by 15% of backoff |
| 14 | 2 | −7% | None |
| 15 | 2 | −7% | Lower FH by 15% of backoff |
| 16 | 2 | +14% | None |
| 17 | 2 | +14% | Lower FH by 15% of backoff |
| 18 | 2 | −14% | None |
| 19 | 2 | −14% | Lower FH by 15% of backoff |
| 20 | 2 | +21% | None |
| 21 | 2 | +21% | Lower FH by 15% of backoff |
| 22 | 2 | −21% | None |
| 23 | 2 | −21% | Lower FH by 15% of backoff |
| 24 | 2 | +28% | None |
| 25 | 2 | +28% | Lower FH by 15% of backoff |
| 26 | 2 | −28% | None |
| 27 | 2 | −28% | Lower FH by 15% of backoff |
| 28 | 2 | 0% (disable EROC) | None |
| 29 | 2 | 0% (disable EROC) | Lower FH by 15% of backoff |

It is possible to provide error recovery in which changes other than track offset are used in place of, or combined with fly height adjustment. Table IV outlines a procedure which responds to ECC error by using such other changes without using fly height adjustment, while Table V outlines a procedure which uses both fly height adjustment and other procedures. Unless otherwise indicated, amounts are percentages or scaled. Table VI defines the features of Tables IV and V.

TABLE IV

| Level | Revs | Track Offset (%) | Feature Changes |
|---|---|---|---|
| 1 | 1 | +8 | None |
| 2 | 1 | +15 | None |
| 3 | 1 | −8 | None |
| 4 | 1 | −15 | None |
| 5 | 3 | 0% | RRO_MD = 0 (disable EROC) |
| 7 | 1 | 0% | Boost = +4 dB |
| 8 | 1 | 0% | Boost = +8 dB |
| 9 | 5 | 0% | Boost = +12 dB, Cutoff = −5 MHz, TWUG = 3 |
| 10 | 5 | 0% | Boost = +16 dB, Cutoff = −5 MHz, TWUG = 3 |
| 11 | 5 | 0% | Boost = +20 dB, Cutoff = −10 MHz, TWUG = 3 |
| 12 | 5 | 0% | Boost = +24 dB, Cutoff = −10 MHz, TWUG = 3 |
| 13 | 1 | 0% | Boost = +28 dB, Cutoff = −10 MHz |
| 14 | 1 | 0% | Cutoff = −5 MHz |
| 15 | 1 | 0% | Readbias = −2 mA |
| 16 | 1 | 0% | Readbias = −2 mA |
| 17 | 1 | 0% | Readbias = −2 mA |
| 18 | 1 | 0% | Readbias = +1 mA |
| 19 | 1 | 0% | Readbias = +1 mA |
| 20 | 1 | 0% | Readbias = +1 mA |
| 21 | 5 | 0% | PHUGR = 3, FUGR = 3 |
| 22 | 5 | 0% | PHUGR = 3, FUGR = 3 |
| 23 | 5 | 0% | Asymmetry Cancellation +50% h |
| 24 | 5 | 0% | Asymmetry Cancellation −50% h |

TABLE V

| Level | Revs | Track Offset (%) | Feature Changes |
|---|---|---|---|
| 1 | 1 | +8 | None |
| 2 | 1 | +15 | None |
| 3 | 1 | −8 | None |
| 4 | 1 | −15 | None |
| 5 | 3 | 0% | RRO_MD = 0 (disable EROC) |
| 7 | 1 | 0% | Boost = +4 dB |
| 8 | 1 | 0% | Boost = +8 dB |

TABLE V-continued

| Level | Revs | Track Offset (%) | Feature Changes |
|---|---|---|---|
| 9 | 3 | 0% | Boost = +12 dB, Cutoff = −5 MHz, TWUG = 3 |
| 10 | 2 | 0% | Boost = +12 dB, Cutoff = −5 MHz, TWUG = 3 Lower FH by 30% of backoff |
| 11 | 3 | 0% | Boost = +16 dB, Cutoff = −5 MHz, TWUG = 3 |
| 12 | 2 | 0% | Boost = +16 dB, Cutoff = −5 MHz, TWUG = 3 Lower FH by 30% of backoff |
| 13 | 3 | 0% | Boost = +20 dB, Cutoff = −10 MHz, TWUG = 3 |
| 14 | 2 | 0% | Boost = +20 dB, Cutoff = −10 MHz, TWUG = 3 Lower FH by 30% of backoff |
| 15 | 3 | 0% | Boost = +24 dB, Cutoff = −10 MHz, TWUG = 3 |
| 16 | 2 | 0% | Boost = +24 dB, Cutoff = −10 MHz, TWUG = 3 Lower FH by 30% of backoff |
| 17 | 1 | 0% | Boost = +28 dB, Cutoff = −10 MHz |
| 18 | 1 | 0% | Cutoff = −5 MHz |
| 19 | 1 | 0% | Read bias = −2 mA |
| 20 | 1 | 0% | Read bias = −2 mA |
| 21 | 1 | 0% | Read bias = −2 mA |
| 22 | 1 | 0% | Read bias = +1 mA |
| 23 | 1 | 0% | Read bias = +1 mA |
| 24 | 1 | 0% | Read bias = +1 mA |
| 25 | 5 | 0% | PHUGR = 3, FUGR = 3 |
| 26 | 5 | 0% | PHUGR = 3, FUGR = 3 |
| 27 | 5 | 0% | Asymmetry Cancellation +50% h |
| 28 | 5 | 0% | Asymmetry Cancellation −50% h |

TABLE VI

| Feature | Meaning |
|---|---|
| RRO_MD | Repeatable run out mode selection |
| Boost | Analog boost of the continuous time filter |
| Cutoff | Cutoff frequency of the analog continuous time filter |
| TWUG | Tap weight update gain for FIR taps |
| Read bias | Read bias current applied to head |
| PHUGR | Phase update gain during read for timing control |
| FUGR | Frequency update gain during read for timing control |
| Asymmetry Cancellation | Amount of MR asymmetry cancellation to be applied |

Although, as noted above, reaction to a thermal asperity can include an increase in fly height, Table VII outlines an error recovery retry sequence which can include different amounts of Fly Height increase.

TABLE VII

| Level | Revs | Track Offset | Feature Changes |
|---|---|---|---|
| 1 | 1 | +7% | none |
| 2 | 1 | −7% | none |
| 3 | 1 | +14% | none |
| 4 | 1 | −14% | none |
| 5 | 1 | +21% | none |
| 6 | 1 | −21% | none |
| 7 | 1 | +28% | none |
| 8 | 1 | −28% | none |
| 9 | 1 | 0% (disable EROC) | none |
| 10 | 2 | 0% | Increase FH by 40% of backoff |
| 11 | 2 | 0% | Increase FH by 80% of backoff |
| 12 | 2 | +7% | Increase FH by 40% of backoff |

TABLE VII-continued

| Level | Revs | Track Offset | Feature Changes |
|---|---|---|---|
| 13 | 2 | +7% | Increase FH by 80% of backoff |
| 14 | 2 | −7% | Increase FH by 40% of backoff |
| 15 | 2 | −7% | Increase FH by 80% of backoff |
| 16 | 2 | +14% | Increase FH by 40% of backoff |
| 17 | 2 | +14% | Increase FH by 80% of backoff |
| 18 | 2 | −14% | Increase FH by 40% of backoff |
| 19 | 2 | −14% | Increase FH by 80% of backoff |
| 20 | 2 | +21% | Increase FH by 40% of backoff |
| 21 | 2 | +21% | Increase FH by 80% of backoff |
| 22 | 2 | −21% | Increase FH by 40% of backoff |
| 23 | 2 | −21% | Increase FH by 80% of backoff |
| 24 | 2 | +28% | Increase FH by 40% of backoff |
| 25 | 2 | +28% | Increase FH by 80% of backoff |
| 26 | 2 | −28% | Increase FH by 40% of backoff |
| 27 | 2 | −28% | Increase FH by 80% of backoff |
| 28 | 2 | 0% (disable EROC) | Increase FH by 40% of backoff |
| 29 | 2 | 0% (disable EROC) | Increase FH by 80% of backoff |

Table VIII outlines a retry sequence, in response to a servo off-track error during a read access, without fly height adjustments and Table IX outlines a corresponding sequence, but with fly height adjustments.

TABLE VIII

| Level | Revs | Track Offset |
|---|---|---|
| 1 | 2 | +5% |
| 2 | 2 | −5% |
| 3 | 2 | +7% |
| 4 | 2 | −7% |
| 5 | 3 | +10% |
| 6 | 3 | −10% |
| 7 | 3 | 0% (disable EROC) |

TABLE IX

| Level | Revs | Track Offset | Feature Changes |
|---|---|---|---|
| 1 | 1 | +5% | None |
| 2 | 1 | +5% | increase FH by 50% of backoff |
| 3 | 1 | −5% | None |
| 4 | 1 | −5% | increase FH by 50% of backoff |
| 5 | 1 | +7% | None |
| 6 | 1 | +7% | increase FH by 50% of backoff |
| 7 | 1 | −7% | None |
| 8 | 1 | −7% | increase FH by 50% of backoff |
| 9 | 2 | +10% | None |
| 10 | 1 | +10% | increase FH by 50% of backoff |
| 11 | 2 | −10% | None |
| 12 | 1 | −10% | increase FH by 50% of backoff |
| 13 | 2 | 0% (disable EROC) | None |
| 14 | 1 | 0% (disable EROC) | increase FH by 50% of backoff |

The present invention, in various embodiments, includes components, methods, processes, systems and/or apparatuses substantially as depicted and described herein, including various embodiments, sub-combinations, and subsets thereof. Those skilled in the art will understand how to make and use the present invention after understanding the present disclosure. The present invention, and various embodiments, includes providing the devices and processes in the absence of items not depicted and/or described herein or in various embodiments hereof, including in the absence of such items as may have been used in previous devices or processes, e.g., for improving performance, achieving ease of implementation and/or reducing cost of implementation. The present invention includes items which are novel, and terminology adapted from previous and/or analogous technologies, for convenience in describing novel items or processes, do not necessarily retain all aspects of conventional usage of such terminology.

The foregoing discussion of the invention has been presented for purposes of illustration and description. The foregoing is not intended to limit the invention to the forms or form disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An apparatus for use in a hard disk drive, having at least a first read head, which includes data written in a plurality of tracks having an average inter-track distance, comprising:
    first circuitry which detects a read error at a first disk location while using a first normal fly height and outputs a first signal in response;
    second circuitry which attempts at least a first re-read of data at said first disk location while positioning said read head so as to be both off-track by a first off-track amount less than said average inter-track distance and at a second fly height different from said first fly height and attempts an additional re-read of data at said first disk location while re-positioning said read head to be off-track by a second off-track amount different from said first off-track amount and at a fly height different from said first normal fly height.

2. An apparatus as claimed in claim 1, wherein said second circuitry positions said fly height to be different from said first normal fly height only after at least one attempt is made to re-read while said read head is at said first normal fly height.

3. An apparatus as claimed in claim 1, wherein said second fly height differs from said first normal fly height by an amount about equal to a multiple of 0.5 nm.

4. An apparatus as claimed in claim 1, wherein said second circuitry includes a programmed microcontroller.

5. An apparatus as claimed in claim 1, further comprising circuitry which attempts the additional re-read of data at said first disk location while positioning said read head so as to be at a fly height different from said second fly height and different from said first normal fly height.

6. A method for use in a hard disk drive, having at least a first read head, which includes data written in a plurality of tracks having an average inter-track distance, comprising:
    detecting a read error at a first disk location while using a first normal fly height and outputting a first signal in response;
    performing at least a first re-read of data at said first disk location while positioning said read head so as to be both off-track by a first off-track amount less than said average inter-track distance and at a second fly height different from said first fly height; and
    performing an additional re-read of data at said first disk location while re-positioning said read head to be off-track by a second off-track amount different from said first off-track amount and at a fly height different from said first normal fly height.

7. A method as claimed in claim 6, further comprising:
    positioning said fly height to be different from said first normal fly height only after at least one attempt is made to re-read while said read head is at said first normal fly height.

8. A method as claimed in claim 6, further comprising:
    performing the additional re-read of data at said first disk location while positioning said read head so as to be at a fly height different from said second fly height and different from said first normal fly height.

* * * * *